(12) United States Patent
Lee

(10) Patent No.: US 8,412,692 B2
(45) Date of Patent: Apr. 2, 2013

(54) METHOD AND APPARATUS TO INSERT A SCANNED DOCUMENT

(75) Inventor: Seung-yul Lee, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 263 days.

(21) Appl. No.: 11/237,791

(22) Filed: Sep. 29, 2005

(65) Prior Publication Data

US 2006/0074849 A1  Apr. 6, 2006

(30) Foreign Application Priority Data

Oct. 1, 2004 (KR) .................. 10-2004-0078483

(51) Int. Cl.
*G06F 7/00* (2006.01)
*G06F 17/30* (2006.01)
(52) U.S. Cl. .................................................. 707/705
(58) Field of Classification Search ............ 707/102, 707/1, 2, 3, 4, 5, 6, 7, 100, 101, 705, 999.1
See application file for complete search history.

(56) References Cited

U.S. PATENT DOCUMENTS

| | | | | |
|---|---|---|---|---|
| 5,103,490 A * | 4/1992 | McMillin | | 382/284 |
| 6,301,586 B1 * | 10/2001 | Yang et al. | | 1/1 |
| 6,363,381 B1 * | 3/2002 | Lee et al. | | 1/1 |
| 6,396,598 B1 * | 5/2002 | Kashiwagi et al. | | 358/474 |
| 6,751,628 B2 * | 6/2004 | Coady | | 1/1 |
| 6,948,133 B2 * | 9/2005 | Haley | | 715/780 |
| 7,002,700 B1 * | 2/2006 | Motamed | | 358/1.1 |
| 7,243,305 B2 * | 7/2007 | Schabes et al. | | 715/257 |
| 7,281,018 B1 * | 10/2007 | Begun et al. | | 1/1 |
| 2004/0030693 A1 * | 2/2004 | Toda | | 707/4 |
| 2004/0150854 A1 * | 8/2004 | Sprague et al. | | 358/1.15 |

FOREIGN PATENT DOCUMENTS

| | | |
|---|---|---|
| JP | 11-53527 | 2/1999 |
| JP | 2000-353172 | 12/2000 |
| JP | 2001-60191 | 3/2001 |
| KR | 2003-44907 | 6/2003 |

OTHER PUBLICATIONS

Korean Office Action dated Feb. 27, 2006, issued in KR 2004-78483.

* cited by examiner

*Primary Examiner* — Aleksandr Kerzhner
(74) *Attorney, Agent, or Firm* — Stanizone & Kim, LLP

(57) ABSTRACT

A method of inserting a scanned document includes inputting a user command to select a position in a first document file where to insert a second document file, generating a file corresponding to the second document file, to have same format as the first document file, and generating a third document file in which the second document file is inserted in the first document file, at the selected position.

18 Claims, 5 Drawing Sheets

METHOD AND APPARATUS TO INSERT A SCANNED DOCUMENT

CROSS-REFERENCE TO RELATED APPLICATIONS

This application claims the priority under 35 U.S.C. §119 of Korean Patent Application No. 2004-78483, filed on Oct. 1, 2004, in the Korean Intellectual Property Office, the disclosure of which is incorporated herein in its entirety by reference.

BACKGROUND OF THE INVENTION

1. Field of the Invention

The present general inventive concept relates to a method and apparatus to insert a scanned document, and more particularly, to a method and apparatus to generate a scanned document in a file format corresponding to an existing document file, insert the scanned document at a predetermined position in the existing document file, and store the resulting document file.

2. Description of the Related Art

Recently, recording media having a large storage capacity are produced at a lower cost so that users increasingly tend to store information that was originally on a paper document, as digitalized image files on the recording media. To digitize the information on the paper, the user scans the paper document to generate a digital document and stores the generated digital document on a recording medium, in an image file format such as PS, PDF, or TIFF for safekeeping.

FIG. 1 is a flow chart illustrating a conventional method of inserting a scanned document at a predetermined position in an existing document file. Referring to FIG. 1, a first document file stored on a memory portion (not shown) is selected and displayed on a display portion (not shown) (Step 110). A position where a second document is to be inserted is selected in the displayed first document file (Step 120). After the position where to insert the second document in the first document file is selected, the second document to be inserted is scanned using a scanner (not shown) to generate [a] scan data. An image file in a format such as PS, PDF, or TIFF is generated from the generated scan data (Step 130). The first and second document files are edited using an editing program so that the second document file is inserted at a predetermined position in the first document file (Step 140). The first document file is a document file that was scanned previously and stored in an image file format such as PS, PDF, or TIFF. The second document is a document that is scanned and inserted in the first document file.

As shown in FIG. 1, the conventional method of inserting the scanned document needs a complicated data processing step generating an image file from the scan data of the second document, and inserting the generated image file in the first document file using the editing program. Moreover, according to the conventional method, to easily insert the second document file in the first document file, the user needs to be accustomed to the use of both of the editing program and a data processing apparatus on which the editing program is executed to insert the second document file in the first document file.

SUMMARY OF THE INVENTION

The present general inventive concept provides a method of inserting a scanned document directly at a predetermined position in an existing document file.

The present general inventive concept also provides an apparatus to easily insert a scanned document directly at a selected position in an existing document file.

Additional aspects and advantages of the present general inventive concept will be set forth in part in the description which follows and, in part, will be obvious from the description, or may be learned by practice of the general inventive concept.

The foregoing and other aspects of the present general inventive concept may be achieved by providing a method of inserting a scanned document, the method comprising inputting a user command to select a position where a second document is inserted in a first document file, generating a second document file corresponding to a format of the first document file from a scanned second document, and generating a third document file in which the second document file is inserted in the first document file at the selected position.

The generating of the second document file may comprise scanning the second document, [and] generating scan data of the second document, and adding an information header with respect to the second document to the scan data of the second document.

The generating of the third document file may comprise changing information on a position of the first document file based on the selected position where the second document is inserted, so that the second document file is inserted at the selected position in the first document file, and generating a third document file in which the second document file is inserted in the first document file, based on the changed information on the position of the first document file.

The foregoing and other aspects of the present general inventive concept may also be achieved by providing an apparatus to insert a scanned document in an existing document at a selected position, the apparatus comprising a user interface portion to input a user command to selected a position where a second document is inserted in a first document file, a second document file generating portion to generate a second document file corresponding to a format of the first document file from scan data of the second document, and a third document file generation portion to generate a third document file in which the second document file is inserted in the first document file at the selected position.

The second file generation portion may comprise a scan portion to scan the second document and to generate scan data of the second document, and a header insertion portion to insert a head to indicate position information on the second document in the generated scan data of the second document.

The third document file generation portion may comprise a position information change portion to update the position information of the first document file based on the selected position where the second document is inserted, so that the second document file is inserted at the selected position in the first document file, and a file generation portion to generate a third document file in which the second document file is inserted in the first document file, including the changed information on the position of the first document file.

The foregoing and other aspects of the present general inventive concept may also be achieved by providing an apparatus to insert at least one document in an existing document file at a selected position comprising a user interface portion to generate a user interface to allow a user to choose a name of a first document file, a selected position in the first document file where to insert a second document file and a name of a third document file, and a processing module to convert the second document file in same format as the first document, to generate a third document file by modifying the first document file according to the insertion of the second document file at the selected position, and to store the third document file.

The foregoing and other aspects of the present general inventive concept may also be achieved by providing a method of inserting a scanned document into a first document file including one or more documents of at least one page long comprising generating a user interface to allow a user to choose a name of a first document file, a selected position in the first document file where to insert a second document file, a name of a third document file, converting the second document file in the same format as the first document, generating a third document file by modifying the first document file according to the insertion of the second document file at the selected position, and storing the third document file using the name of a third document file.

The foregoing and other aspects of the present general inventive concept may also be achieved by providing a method of inserting a scanned file into a first image file at a selected position in the first file, when the first file has a format including structural information, the method comprising recovering the first image file from a memory and displaying the first image file structural information, selecting the position in the first file where to insert the scanned file according to the first image file structural information, modifying the first image file structural information to reflect the insertion of the scanned file into the first image file, generating a merger image file that has the content of the scanned file inserted into the first file at the selected position, has same format as the first image file and contains the modified first file structure information, and saving the merger image file in the memory, unless another scan file insertion in same file follows.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
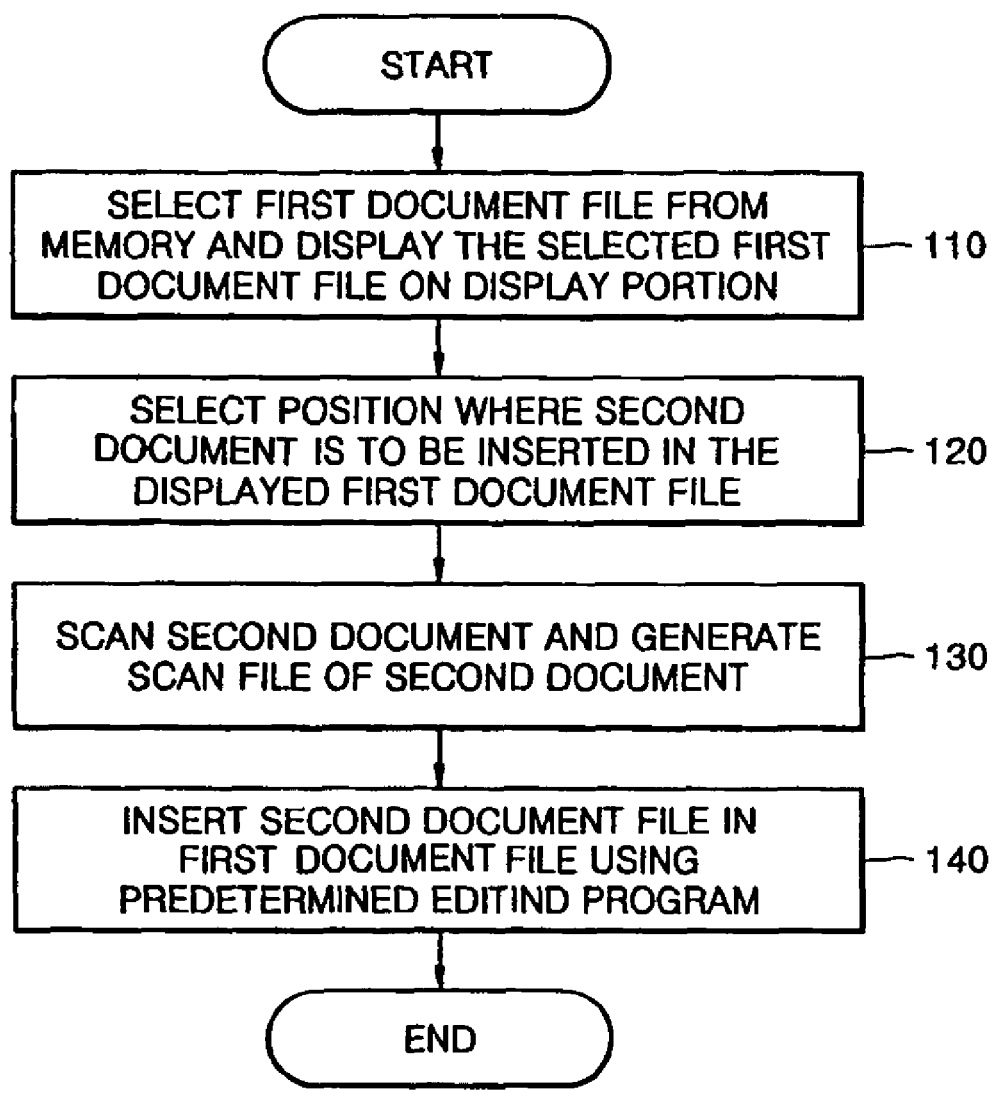
FIG. 1 is a flow chart illustrating a conventional method of inserting a scanned document at a predetermined position in an existing document file.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
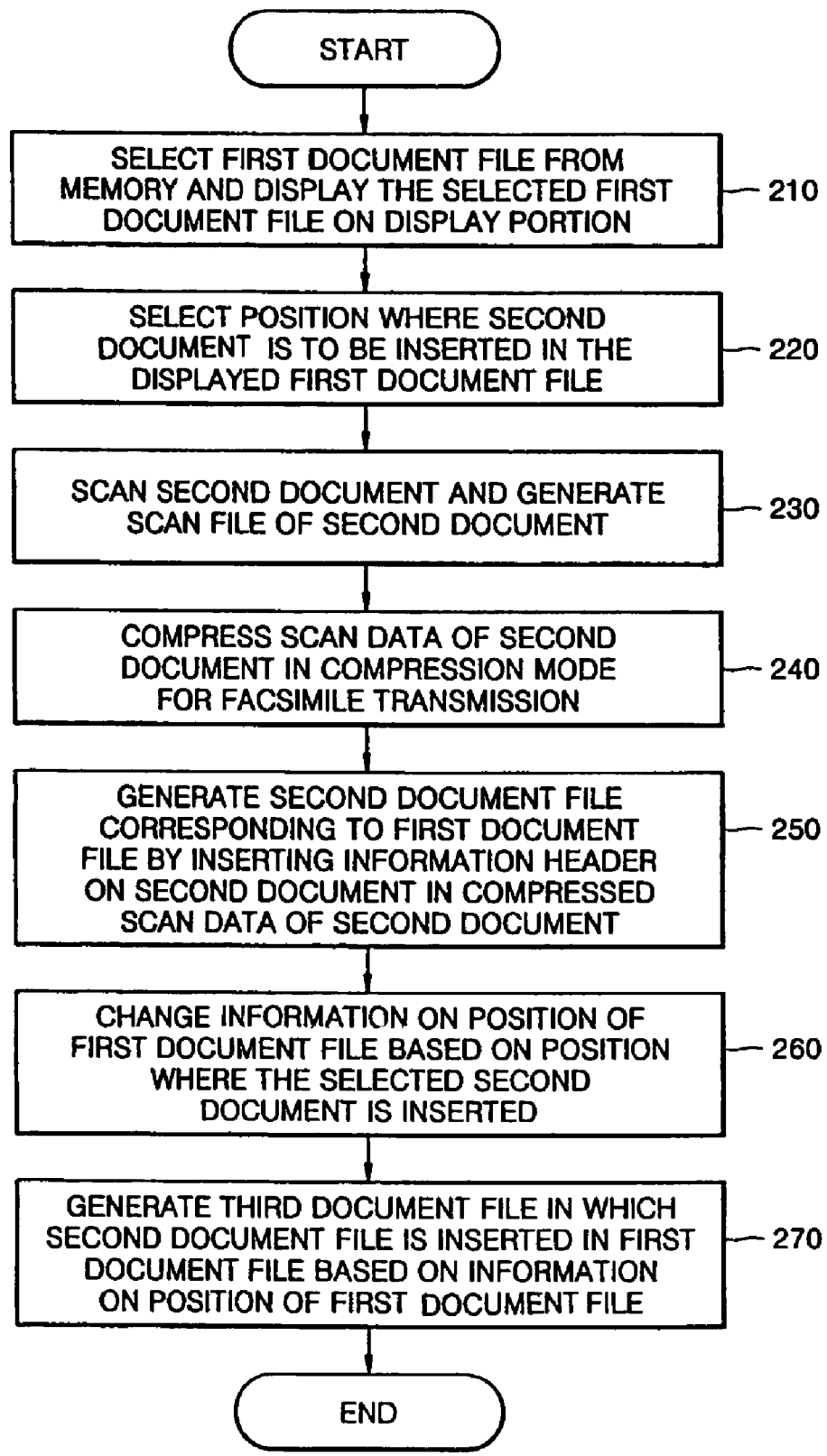
FIG. 2 is a flow chart illustrating a method of inserting a scanned document directly at a predetermined position in an existing document file according to an embodiment of the present general inventive concept.

FIG. 2 is a flow chart illustrating a method of inserting a scanned document directly at a selected position in an existing document file according to an embodiment of the present general inventive concept. A first document file is selected from one or more files stored in a memory portion (not shown) and the selected first document file is displayed on a display portion (not shown) (operation 210). The memory portion can be a memory included in an apparatus to insert a scanned document, or an external memory connected to the apparatus, for example, via a USB port. The one or more document files stored in the memory portion can be document image files obtained by scanning documents using a scanner (not shown), having an image file format such as PostScript (PS), Portable Document Format (PDF), or Tagged Image File Format (TIFF). The first document file displayed on the display portion includes documents each having at least one page. The first document file includes information on positions in the first document file of the included documents having the at least one page. The position information can be a page number or an address relative to the beginning of the file.

A position where the second document is going to be inserted in the displayed first document file) is selected (operation 220). A user interface portion (not shown) allows the user to select the position where the second document is to be inserted in the displayed first document file. The insertion of the second document in the first document may also be performed even if the user does not select the insertion position, using a default position, for example, at the beginning or end of the file. The page numbers of the documents having at least one page included in the first document file may be displayed on the display portion. The user selects the position where to insert the second document by inputting a page number of the first document file. The user may also select the position in the first document file where to insert the second document using a selection key panel of the user interface portion. The user may input the page number where the second document is inserted in the first document using the numeric keys.

After the position in the first document file where to insert the second document is selected, the second document is scanned by the scanner and scan data of the second document is generated (operation 230). By inserting an information header in the second document scan data, it is generated a file corresponding to the second document, having the same format as the first document file (operation 250). The information header includes information about the data file type of the second document file and a size of the scan data. The header information may indicate the size of the scan data as number of pages.

The generated scan data of the second document may be compressed (operation 240). In a multifunctional office apparatus including functions of a facsimile, a scanner, and a photocopier, the generated scan data of the second document can be compressed by a compression module included. The compression module, such as Modified Modified Read (MMR), Modified Read (therein MR), or Modified Huffman (MH), is used to compress data before a fax transmission.

The generated second document file with same format as the first document file is inserted in the selected position of the first document file (operations 260 and 270). The position information of the at least one page documents included in the first document file is changed based on the insertion position of the second document file selected in operation 220 (operation 260). For example, after inserting the second document file in the first document file, a third document file is generated based on the changed position information of the first document file (Step 270). A name of the third document file is designated by the user and stored in the memory portion, or the third document file may overwrite the first document file.

Figure 3:
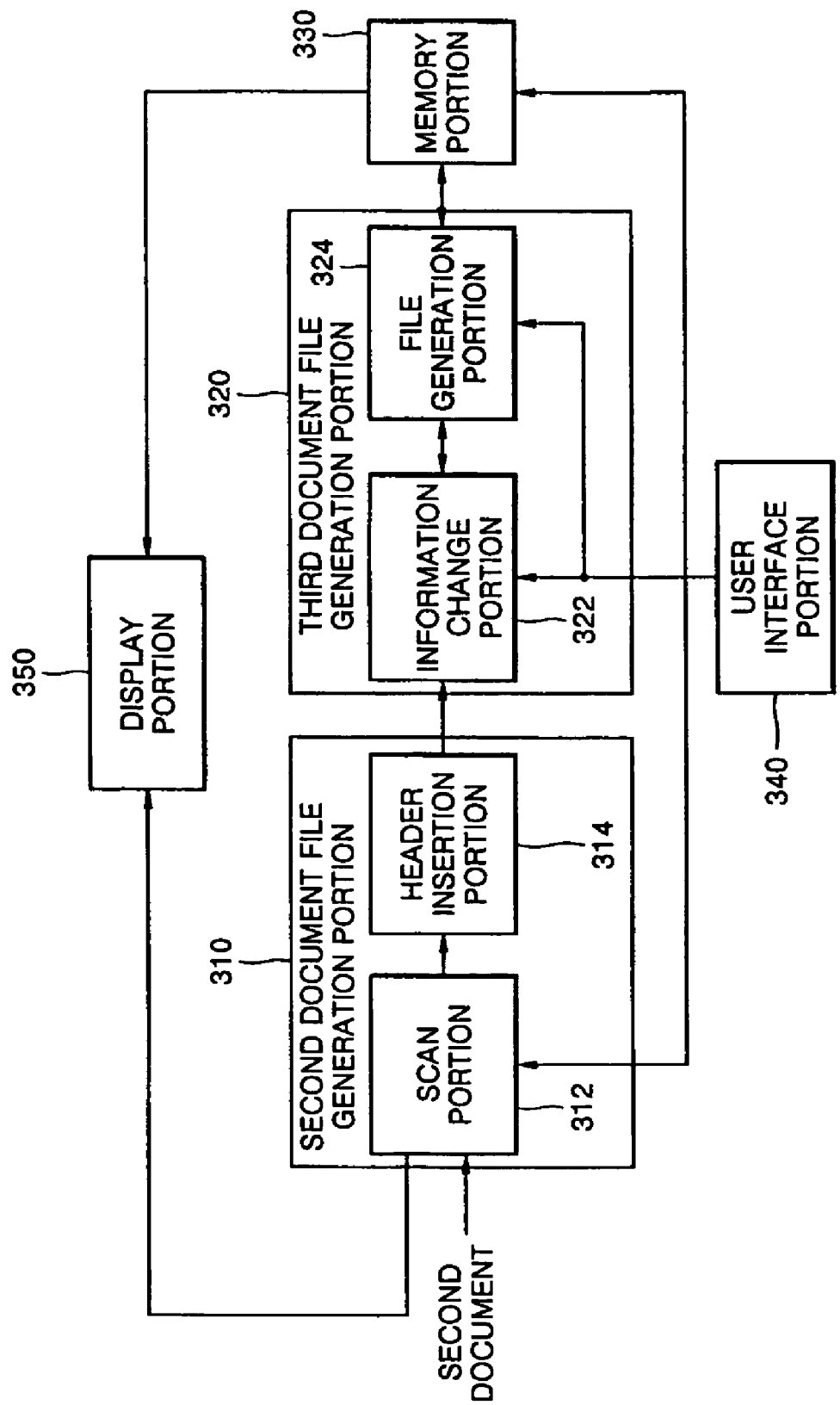
FIG. 3 is a block diagram of an apparatus to insert a scanned document directly at a predetermined position in an existing document file according to an embodiment of the present general inventive concept.

FIG. 3 is a block diagram of an apparatus to insert a scanned document directly at a predetermined position in an existing document file according to an embodiment of the present general inventive concept. Referring to FIG. 3, the scanned document insertion apparatus includes a second document file generation portion 310, a third document file generation portion 320, a memory portion 330, a user interface portion 340, and a display portion 350.

The memory portion 330 stores a first document file previously created. The memory portion 330 can be incorporated in the scanned document insertion apparatus, or can be an external memory connected to the scanned document insertion apparatus, for example, using a USB connection. According to a user command input through the user interface portion 340, the display portion 350 displays a second document scanned by the second document file generation portion 310, or a first document file stored in the memory portion 330.

The second document file generation portion 310 includes a scan portion 312 and a header insertion portion 314. The scan portion 312 scans the second document to be inserted in the first document file and generates scan data corresponding to the second document. The header insertion portion 314 inserts an information header in the second document scan data generated by the scan portion 312, and generates a second document file having the same format as the first document file.

The third document file generation portion 320 includes a position information change portion 322 and a file generation portion 324. The first document file stored in the memory portion 330 is provided to the third document file generation portion 320 to insert the second document file in the first document file. The position information change portion 322 changes information on the position of the first document file so that the second document file is inserted by the second document insertion portion at the position selected by the user through the user interface portion 340. The first document file includes documents having at least one page with same format as its own file format, and information on the position of the documents having at least one page. The file generation portion 324 generates a third document file by inserting the second document file in the first document file based on the position information of the first document file as modified by the position information change portion 322. For example, a size or a page number of third document files may be changed according to insertion of the second document file among the at least one page documents contained in the first document file. Using the user interface portion 340, a user may input a name for the generated third document file, or overwrite the first document file with the generated third document file. The file generation portion 324 generates the third document file having the name of the third document file input through the user interface portion 340 or the name of the first document file.

Figure 4:
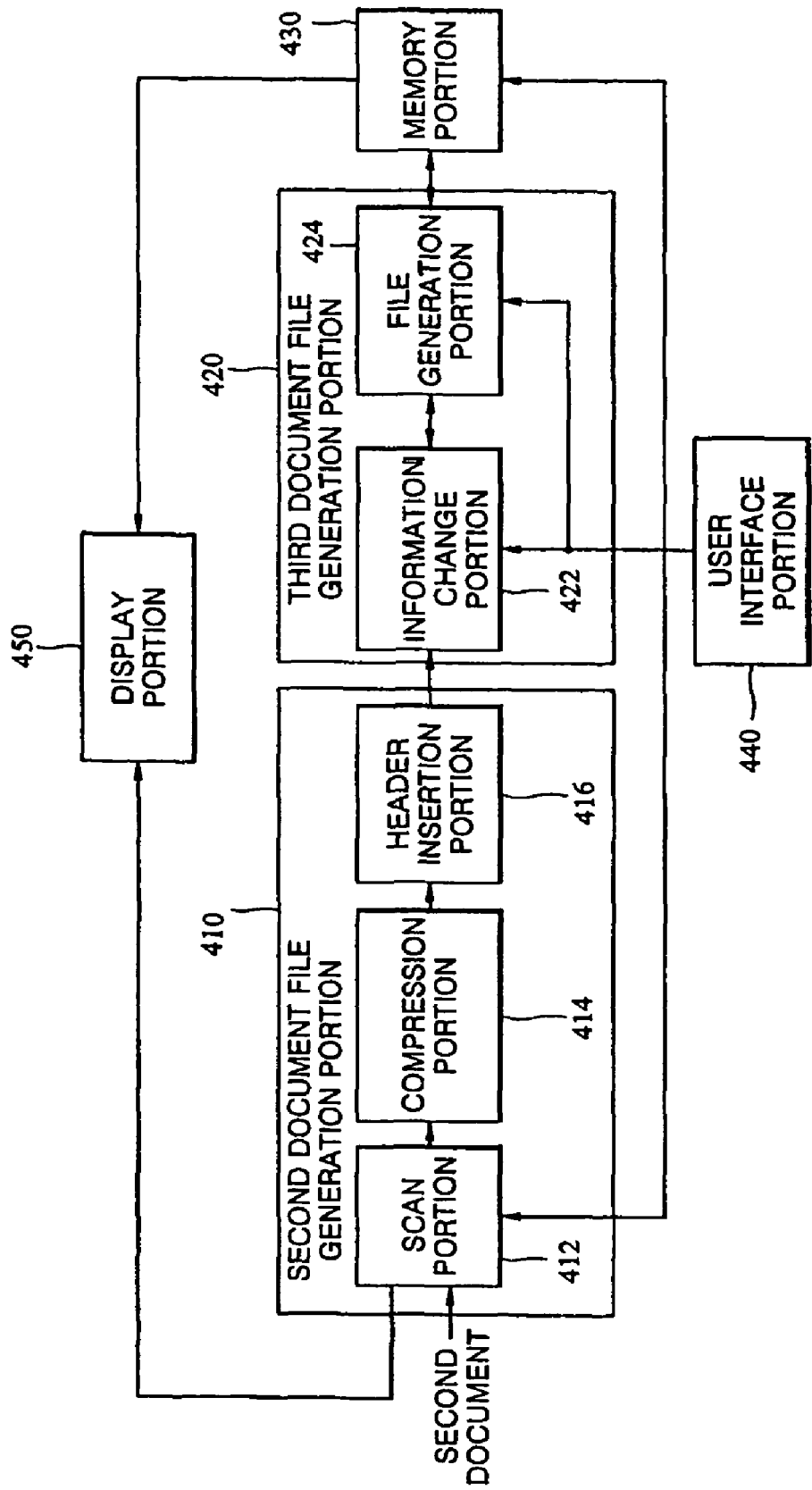
FIG. 4 is a block diagram of an apparatus to insert a scanned document directly at a predetermined position in an existing document file according to another embodiment of the present general inventive concept.

FIG. 4 is a block diagram of an apparatus to insert a scanned document directly at a predetermined position in an existing document file, according to another embodiment of the present general inventive concept. Referring to FIG. 4, the scanned document insertion apparatus according to another embodiment of the present general inventive concept includes a second document file generation portion 410, a third document file generation portion 420, a memory portion 430, a user interface portion 440, and a display portion 450. The third document file generation portion 420, the memory portion 430, the user interface portion 440, and the display portion 450 in FIG. 4 perform the same functions of the third document file generation portion 320, the memory portion 330, the user interface portion 340, and the display portion 350 shown in FIG. 4.

The second document file generation portion 410 includes a scan portion 412, a compression portion 414, and a header insertion portion 416. The scan portion 412 and the header insertion portion 416 perform the same functions as the scan portion 312 and the header insertion portion 314 of FIG. 3. The scan data of the second document generated by the scan portion 412 is compressed by the compression portion 414. When the scan document insertion apparatus incorporates a facsimile, the scan data of the second document can be compressed with a compression module, for example, MMR, MR, or MH. In the header insertion portion 416, the information header of the second document is added to the compressed scan data corresponding to the second document to generate a file corresponding to the second document file having same format as the first document file.

Figure 5:
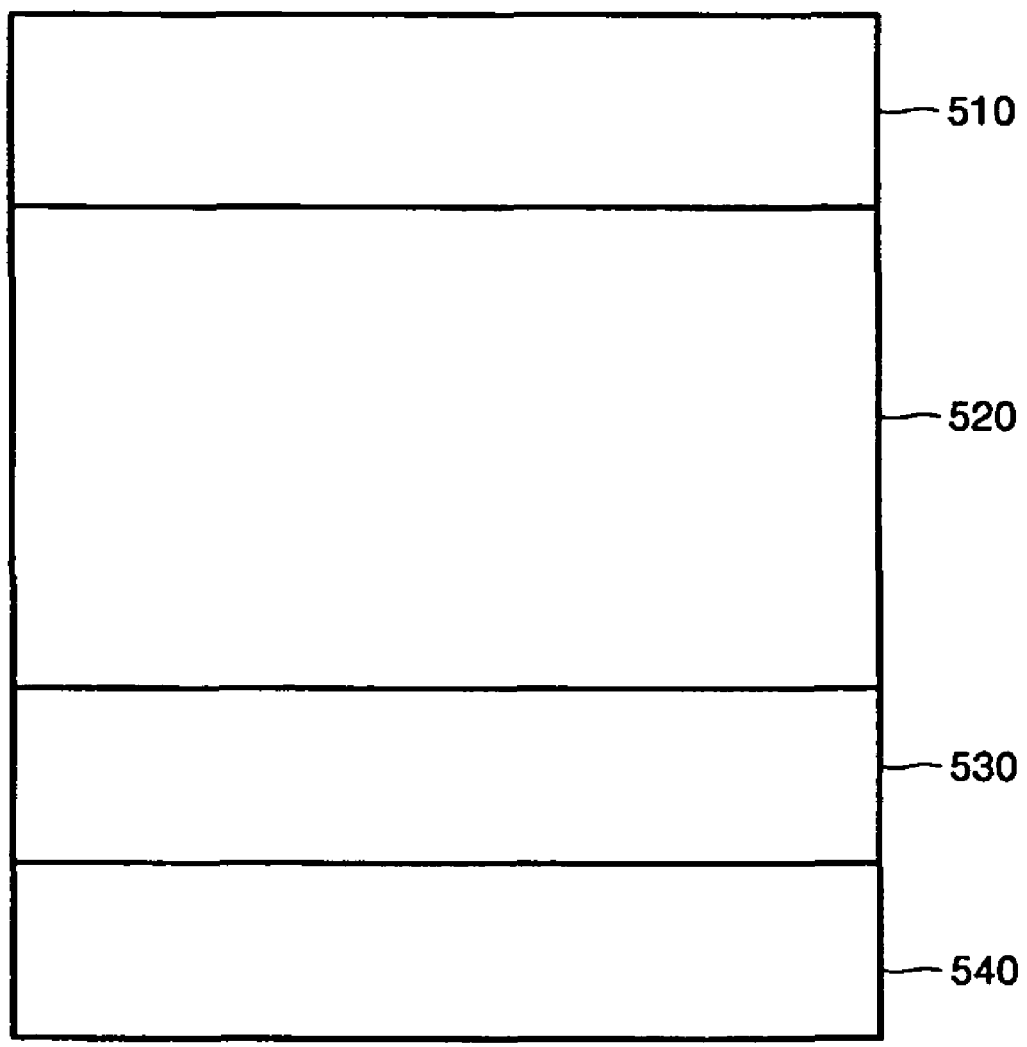
FIG. 5 is an example of a file structure of a file generated in the apparatuses shown in FIGS. 3 and 4.

FIG. 5 is an example of a first document file stored in the memory portion of the scanned document insertion apparatus shown in FIGS. 3 and 4. FIG. 5 illustrates a configuration of a PDF file. However, the first document file can be stored in other image file format such as PDF, PS, or TIFF, but the preset general inventive concept is not limited thereto.

The PDF file includes a header 510, a body 520, a cross-reference table 530, and a trailer 540. A one-page document includes the header 510 and the body 520. The body 520 stores data that is actually stored and the header 510 includes information on the type and size of the data stored in the body 520.

A document file can include documents having a plurality of pages. The cross-reference table 530 and the trailer 540 stores information on the position where each document page of a plurality of the document pages is located in the document file. The position of the second document being inserted in the first document is selected through the user interface portion 340 and 440 of the scanned document insertion apparatuses shown in FIGS. 3 and 4. The information on the position of the first document file is changed according to the position selected to insert the second document.

When the insertion operation is performed, the header 510 is modified to reflect the size of the file after the second file is included into the first file. The type of the data remains unchanged since prior to insertion, the scanned second document was converted in same format as the first document having same data type. The reference table 530 and the trailer 540 will also be modified to reflect the presence and position of the second document among the plurality of the at least one page documents in the file. The body 520 of the second scanned document will merge into the first document body 520.

The above-described embodiments of the present general inventive concept can be converted into a program that is executable on a computer and the program can be realized on a common digital computer using a computer-readable recording medium.

The computer-readable recording medium includes a magnetic storage medium, for example, a ROM, a floppy disk, and a hard disk, and an optical reading medium, for example, a CD-ROM or a DVD.

While this general inventive concept has been particularly shown and described with reference to preferred embodiments thereof, it will be understood by those skilled in the art that various changes in form and details may be made therein without departing from the spirit and scope of the general inventive concept as defined by the appended claims.

As described above, in the method and apparatus for inserting a scanned document according to the present invention, a scanned document is inserted in an existing document file so that a new document file is directly generated in which the scanned document is inserted in the existing document file.

Thus, a user can easily insert the new document in the existing document file without a complicated data processing step such as using a predetermined editing program. Also, a user who is not accustomed to a data processing apparatus and the editing program can easily insert a new document in the existing document file.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of inserting a scanned document comprising:
    inputting a user command to select a position to insert a second document file in a first document file that includes a first trailer storing first document position information, the first document being stored in a memory device;
    scanning a second document and generating the second document file which is scan data of the scanned second document, to have the same format as the first document file in response to the scanning; and
    generating a third document file by inserting the second document file in the first document file, at the selected position, in response to generating the second document file,
    wherein the generating of the second document file comprises:
    generating scan data of the scanned second document, and adding an information header with respect to the second document to the scan data of the second document in response to generating the scan data,
    wherein the generating of the third document file comprises:
    changing the first document position information of the first trailer based on the selected position in response to adding the information header to the scan data of the second document to insert the second document file in the first document file;
    inserting the second document file in the first document file, based on the changed first document position information; and
    creating a new trailer in the third document file based on the changed first document position information of the first trailer in response to inserting the second document file in the first document file.

2. The method as claimed in claim 1, wherein the generating of the second document file further comprises compressing the scan data of the second document in a compression format for facsimile transmission.

3. The method as claimed in claim 2, wherein the compression format for facsimile transmission is one of MR, MH, and MMR.

4. The method as claimed in claim 1, wherein the generating of the third document file comprises:
    changing the first document position information based on the selected position to insert the second document file in the first document file; and generating the third document file in which the second document file is inserted in the first document file, based on the changed first document position information.

5. The method as claimed in claim 1, wherein the format of the first document file is one of PS, PDF, and TIFF.

6. The method as claimed in claim 1, wherein the generating of the third document file comprises receiving a new file name to store the third document file.

7. The method as claimed in claim 1, wherein generating of the third document file comprises writing the third document file with same name as the first document file.

8. A non-transitory computer-readable recording medium containing computer readable codes to perform a method of inserting a scanned document, the method comprising:
    inputting a user command to select a position to insert a second document file in a first document file that includes a first trailer storing first document position information the first document being stored in a memory device;
    scanning a second document and generating the second document file which is scan data of the scanned second document, to have the same format as the first document file in response to the scanning; and
    generating a third document file by inserting the second document file in the first document file, at the selected position, in response to generating the second document file,
    wherein the generating of the second document file comprises:
    generating scan data of the scanned second document, and adding an information header with respect to the second document to the scan data of the second document in response to generating the scan data,
    wherein the generating of the third document file comprises:
    changing the first document position information of the first trailer to include the selected position in response to adding the information header to the scan data of the second document to insert the second document file in the first document file;
    inserting the second document file in the first document file, based on the changed first document position information; and
    creating a new trailer in the third document file based on the changed first document position information of the first trailer in response to inserting the second document file in the first document file.

9. An apparatus to insert a scanned document comprising:
    a user interface memory processor to input a user command to select a position to insert a second document file in a first document file that includes a first trailer storing first document position information the first document being stored in a memory device;
    a second document file generating memory processor including a scan memory processor to scan a second document, and to generate a second document file corresponding to a format of the first document file from scan data of the document in response to the scanning; and
    a third document file generation memory processor to generate a third document file by inserting the second document file in the first document file, based on the selected position where the second document is inserted, in response to generating the second document file, wherein the scan memory processor of the second file generation memory processor generates scan data of the scanned second document as the second document file; and a header insertion memory processor to generate the second document file, in response generating the scan data, by inserting an information header in the second document scan data generated by the scan memory processor, wherein the third document file generation memory processor changes the first document position information of the first trailer based on the selected position in response to adding the information header to the scan data of the second document to insert the second document file in the first document file;

inserting the second document file in the first document file, based on the changed first document position information; and creating a new trailer in the third document file based on the changed first document position information of the first trailer in response to inserting the second document file in the first document file.

10. The apparatus as claimed in claim 9, wherein the second file generation memory processor further comprises a compression memory processor to compress the generated scan data of the document in a compression format for facsimile transmission as the second document file.

11. The apparatus as claimed in claim 10, wherein the compression format for facsimile transmission is one of MR, MH, and MMR.

12. The apparatus as claimed in claim 9, wherein the third document file generation memory processor comprises: a position information change memory processor to change information on a position of the first document file based on the selected position where the document is inserted, so that the second document file is inserted at the selected position in the first document file; and a file generation memory processor to generate the third document file in which the second document file is inserted in the first document file, based on the changed information on the position of the first document file.

13. The apparatus as claimed in claim 12, wherein the format of the first document file is one of PS, PDF, and TIFF.

14. The apparatus as claimed in claim 12, wherein the third file generation memory processor stores a new file name as a name of the third document file.

15. The apparatus as claimed in claim 12, wherein the third file generation memory processor writes the third document file over the first document file.

16. A method of inserting a scanned document into a first document file including one or more documents of at least one page long comprising:

generating a user interface to allow a user to choose a name of a first document file stored in a memory device, a selected position in the first document file where to insert a second document file, a name of a third document file;

scanning a second document to generate a second document file, and converting the second document file in the same format as the first document in response to the scanning;

generating a third document file by modifying the first document file according to the insertion of the second document file at the selected position in response to generating the second document file; and storing the third document file using the name of a third document file in response to generating the third document file, wherein the generating of the second document file comprises:

generating scan data of the second document, and adding an information header with respect to the second document to the scan data of the second document in response to generating the scan data, wherein the generating of the third document file comprises changing the first document position information of the first trailer to include the selected position in response to adding the information header to the scan data of the second document to insert the second document file in the first document file.

17. A method of inserting a scanned file into a first image file at a selected position in the first file, when the first file has a format including structural information, the method comprising:

recovering the first image file from a memory and displaying the first image file structural information;

selecting the position in the first file where to insert the scanned file according to the first image file structural information;

modifying the first image file structural information to reflect the insertion of the scanned file into the first image file;

generating a merger image file that has the content of the scanned file inserted into the first file at the selected position, and converting the merger image file to have the same format as the first image file and to contain the modified first file structure information; and saving the merger image file in the memory, unless another scan file insertion in same file follows, wherein the generating of the second document file comprises:

scanning the second document according to the position selection and generating scan data of the second document to have the same format as the first document file in response to the scanning; and generating the second document file by adding an information header with respect to the second document to the scan data of the second document, and wherein the generating of the third document file comprises:

changing the first document position information based on the selected position in response to generating the second document to have the same format as the first document file to insert the second document file in the first document file;

inserting the second document file in the first document file, based on the changed first document position information; and creating third document position information in the third document file based on the changed first document position information in response to inserting the second document file in the first document file.

18. A method of inserting a scanned document comprising:

inputting a user command to select a position to insert a second document file in a first document file that includes a first trailer storing first document position information, the first document being stored in a memory device;

scanning a second document according to the input user command and generating the second document file, to have the same format as the first document file in response to the scanning; and generating a third document file by inserting the second document file in the first document file, at the selected position, in response to generating the second document file, wherein the generating of the second document file comprises:

generating scan data of the scanned second document, and adding an information header with respect to the second document to the scan data of the second document in response to generating the scan data, wherein the generating of the third document file comprises:

changing the first document position information of the first trailer based on the selected position in response to adding the information header to the scan data of the second document to insert the second document file in the first document file;

inserting the second document file in the first document file, based on the changed first document position information; and creating a new trailer in the third document file based on the changed first document position information of the first trailer in response to inserting the second document file in the first document file.

* * * * *